May 19, 1936. W. B. HARRIS 2,040,992

FLEXIBLE CONNECTION

Filed Feb. 28, 1933

Inventor:
Warren B. Harris
By Owen W. Kennedy
Attorney

Patented May 19, 1936

2,040,992

UNITED STATES PATENT OFFICE 2,040,992

FLEXIBLE CONNECTION

Warren B. Harris, Millbury, Mass.

Application February 28, 1933, Serial No. 658,970

3 Claims. (Cl. 24—123)

The present invention relates to flexible connections, such as are employed for harness cords in looms to transmit the motion of the jacks or levers of a shedding mechanism to the harness frames controlling the warp threads. While connections embodying the invention are particularly adapted for use in connection with looms, obviously they may be used with any other type of mechanical motion requiring the use of a strong, durable flexible connection to transmit a pull.

According to the prevent invention, there is provided a flexible connection characterized by a longitudinally extending layer of braided strands, with an attaching member providing a corrugated shank embedded in the braid, at one or both ends of the connection to deform the braided strands within the surrounding metal ferrule. A connection of this construction possesses high tensile strength combined with great flexibility, due to the braided reinforcing layer with the shank of each attaching member so firmly held by the braided strands that it will not pull out.

Furthermore, by the present invention there is provided means for greatly increasing the holding effect between the end attaching members, the connection and the surrounding ferrule. The above and other advantageous features of the invention will hereinafter more fully appear with reference to the accompanying drawings, in which:—

Like reference characters refer to like parts in the different figures.

Figure 1:
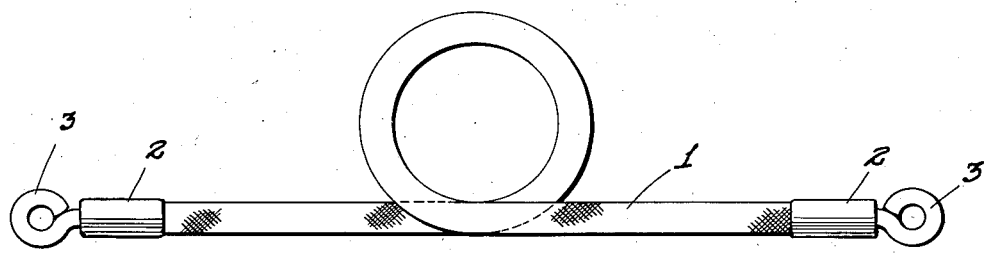
Fig. 1 is a view in elevation of a flexible connection, such as a harness cord, embodying the invention.

Referring first to Fig. 1, one illustrative form of flexible connection embodying the invention comprises a cord portion 1, with metallic ferrules 2 at the ends thereof, and end attaching members, such as eyelets 3, screwed into the cord through holes 2a in the ends of the ferrules. It should be understood, however, that the invention is not limited to the use of ferrules and eyelets in both ends of the cord, and obviously contemplates attaching devices other than eyelets.

Figure 2:
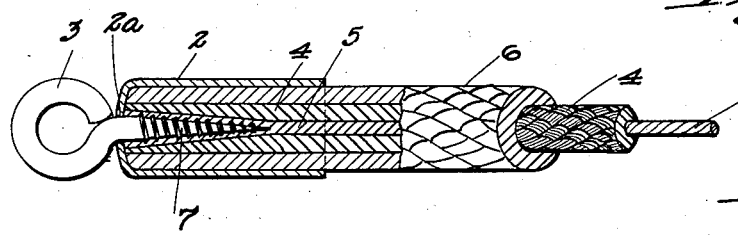
Fig. 2 is an enlarged sectional view through a ferrule at one end of the cord.

Referring now to Fig. 2, the cord 1 comprises an inner layer 4 of braided wire, formed about a central core 5 of soft fibrous material, an outer layer 6 of textile material, such as cotton, being braided about the inner metallic layer 4. In making the article of the invention, a ferrule 2 is forced over an end of the cord 1, which can readily be done, since at that time the end portion of the cord is not expanded. The threaded shank 7 of an eyelet 3 is then inserted through the ferrule opening 2a and screwed into the inner layer 4 of braided wire, the soft fibrous core 5 serving to center the shank 7. The diameter of the shank 7 is greater than the thickness of the core 5, so that as the shank 7 enters, it expands the core 5 which, in turn, uniformly spreads the braided strands of wire, the relatively loose nature of the braiding permitting the core material to be forced between the strands to a certain extent to obtain an interlocking effect. At the same time, expansion of the layer 4 resulting from the entry of the shank 7 causes the surrounding fabric layer 6 of braided material to press firmly against the surrounding ferrule 2, so that the entire end portion of the cord 1 is forcibly compressed within the ferrule and the shank 7 cannot be pulled out.

Figure 3:
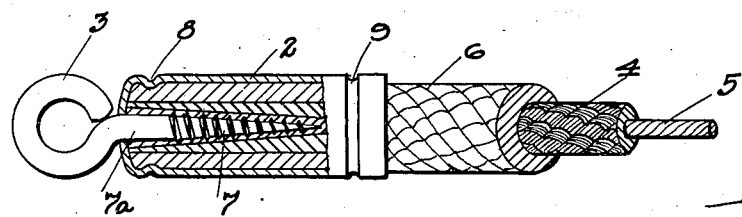
Figs. 3 and 4 are sectional views, similar to Fig. 2, showing modifications of the invention.
Figure 5:
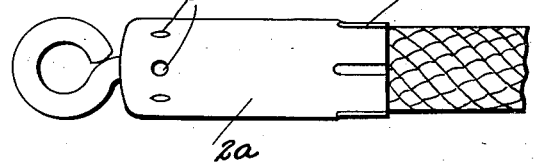
Fig. 5 is a fragmentary view, in side elevation, showing a further modification of the invention.

Referring to Fig. 3, it will be noted that a portion 7a of the shank 7 between the screw threads and the bent eye is unthreaded and after the screwing in of the shank 7, the invention further contemplates subjecting the outside of the ferrule 2 to a rolling or knurling action, which results in the formation of a groove, or depression 8, between the end of the ferrule and where the threads begin on the shank 7. Preferably, coincidentally with the formation of the groove 8 a second groove 9 is formed in the outside of the ferrule 2 at its opposite end, the groove 9 being slightly beyond the end of threaded shank 7. As a result of the formation of the grooves 8 and 9, the threaded portion of shank 7 is locked between the inwardly compressed portions of the cord within the grooves. In other words, the grooves 8 and 9 make it practically impossible for the shank 7 to be shifted axially within the ferrule, so that the strength of the joint between the attaching member, represented by the eyelet 3, and the cord proper is substantially equal to the tensile strength of the braided wire layer 4. By reason of the fact that the outside diameter of the threads on the shank 7 is slightly greater than the unthreaded diameter of the shank 7a, it is practically impossible to unscrew the shank 7 after the formation of the groove 8. In Fig. 5 the ferrule 2a, instead of being externally grooved as in Fig. 3, provides a series of small indentations 10 in surrounding relation to the unthreaded shank portion 7a and second series of longer indentations 11 extending from the end of the ferrule toward the end of the shank 7.

Figure 4:
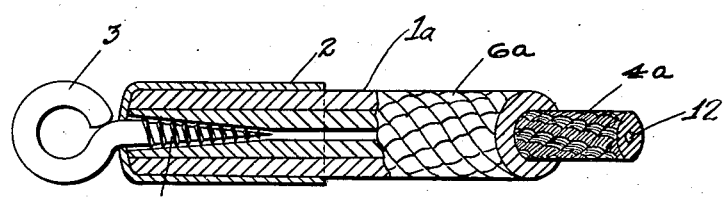

Referring now to Fig. 4, the cord 1a is shown as comprising an inner layer 4a of relatively heavy braided material formed with a small central opening 12 extending therethrough, the layer 4a being covered by an outer layer 6a of textile material, as in Fig. 2. In this construction, the threaded shank 7 of the eyelet 3 is larger than the opening 12 and is centered therein as it is screwed into the ferrule 2, and the braided strands 4a being in direct contact with the threads on the shank 7 tend to assume a form complementary to the threads. This expands the outer layer 6a of textile material within the surrounding ferrule to tightly hold the shank 7 against withdrawal.

From the foregoing, it is apparent that by the present invention there is provided an improved connection of the harness cord type, characterized by its high tensile strength and flexibility due to the layer of braided wire. Furthermore, the attaching members at the ends of the cord are tightly locked within the ferrules, both by the spreading of the braided wire incident to screwing in the threaded shanks, and by the locking of the threaded shanks against unscrewing by external grooving of the ferrules; consequently, a very heavy pull can be transmitted by the connection without possibility of the attaching members coming out of the ferrules. Due to the tendency of any braided material to contract when subjected to a pull, particularly when loosely braided, the inner layer of braided wire holds tightly to the shank of an attaching member when the connection is under tension, thereby further increasing the holding effect.

I claim,—

1. A flexible connection comprising a metallic layer of braided wire, a longitudinally extending core of fibrous material within said braided wire, a ferrule surrounding one end portion of said connection and an attaching device having a threaded shank larger than said core screwed into said braided layer through said ferrule, the core of said layer serving to center said shank and the shank being of such diameter as to cause an appreciable expansion of both said core and said braided layer within said ferrule incident to the screwing in of said attaching device.

2. A flexible connection comprising a metallic layer of loosely braided wire, a longitudinally extending core of fibrous material within said braided wire, a ferrule surrounding one end portion of said connection and an attaching device having a threaded shank larger than said core screwed into said braided layer through said ferrule, the core of said layer serving to center said shank and the shank being of such diameter as to cause an appreciable expansion of both said core and said braided layer within said ferrule incident to the screwing in of said attaching device, accompanied by interlocking of the core material with the braided wire strands.

3. A flexible connection comprising a metallic layer of loosely braided wire extending the entire length of the connection and having an opening therein, a layer of fibrous material surrounding said wire layer, a ferrule fitting over one end of the outer fibrous layer, and an attaching device having a corrugated shank larger than the said opening in said wire and extending into the center of said braided wire layer through said ferrule, the diameter of said shank being such as to cause an appreciable spreading of the braided strands of wire within the ferrule and the surrounding fabric layer, incident to the positioning of the attaching device within the ferrule, so that contraction of the wire strands upon the corrugated shank occurs when the connection is subjected to a tension.

WARREN B. HARRIS.